Figure 1:
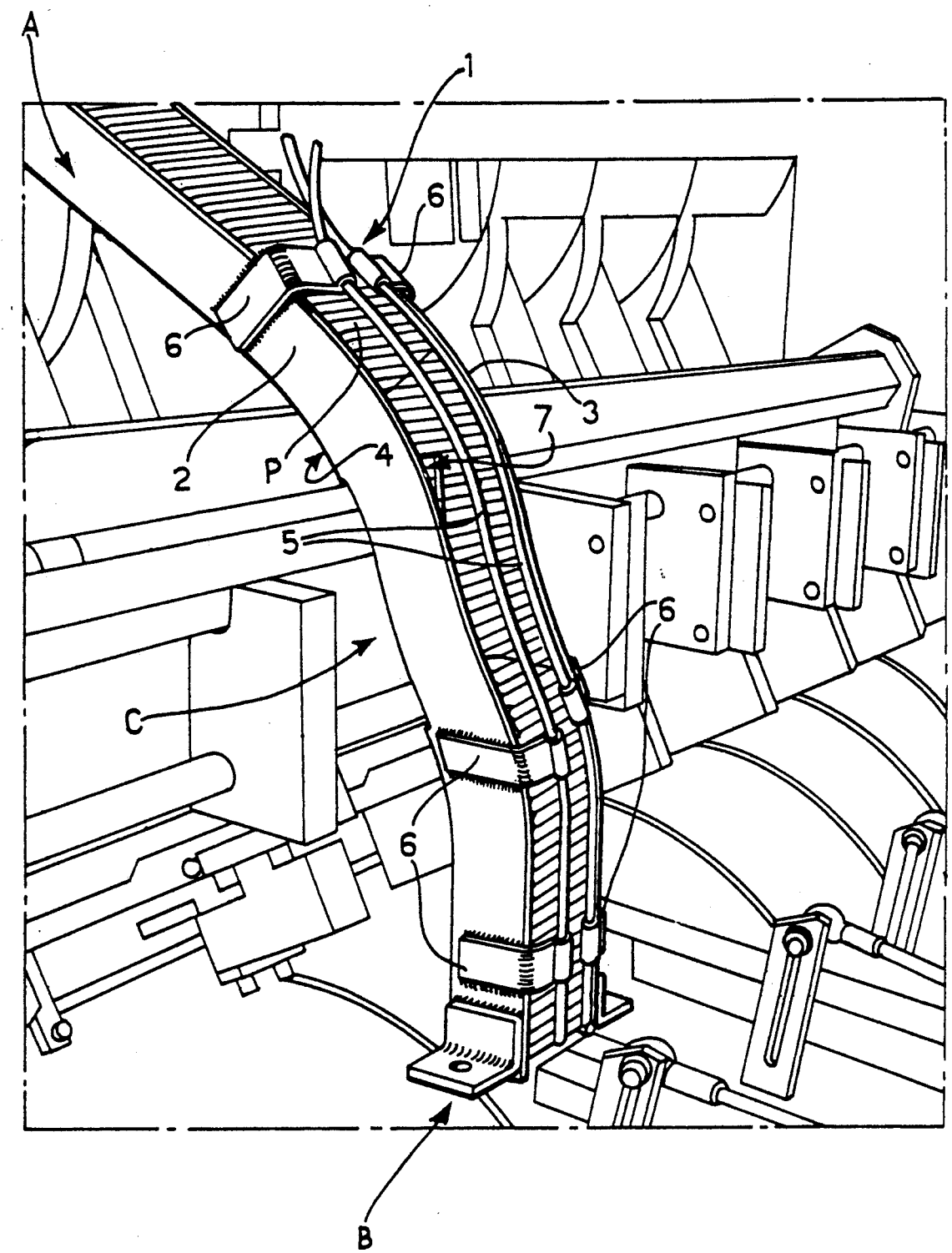

United States Patent [19]

Francioni

[11] Patent Number: 4,991,705

[45] Date of Patent: Feb. 12, 1991

[54] DEVICE FOR TRANSPORTING A FLOW OF PRODUCTS TO BE PACKAGED, WITH THE DISCHARGE OF WRONGLY-POSITIONED PRODUCTS

[75] Inventor: Renzo Francioni, Prato Sesia, Italy

[73] Assignee: Cavanna S.p.A., Italy

[21] Appl. No.: 367,881

[22] Filed: Jun. 19, 1989

[30] Foreign Application Priority Data

Oct. 19, 1988 [IT] Italy .............................. 67939 A/88

[51] Int. Cl.$^5$ .......................................... B65G 47/256
[52] U.S. Cl. ..................................... 193/44; 198/398
[58] Field of Search ................... 193/2 R, 44; 198/398

[56] References Cited

U.S. PATENT DOCUMENTS 2,309,471  1/1943  Moore ................................. 198/398
2,886,157  5/1959  Hall ...................................... 193/44
4,607,742  8/1986  Curley ................................. 198/398
4,795,019  1/1989  Anderson ........................... 193/44

FOREIGN PATENT DOCUMENTS 52275    4/1917   Sweden ............................. 198/398
1357189 12/1987  U.S.S.R. ............................ 193/44

Primary Examiner—Joseph E. Valenza
Attorney, Agent, or Firm—Evenson, Wands, Edwards, Lenahan & McKeown

[57] ABSTRACT

The device is constituted essentially by a channel-shaped guide which is intended to be arranged in an inclined position and has a break in its base wall to enable the expulsion of the products which are travelling flat against that wall. In correspondence with the break, the guide has an S-shaped curve and is bent downwardly to facilitate the expulsion.

11 Claims, 2 Drawing Sheets

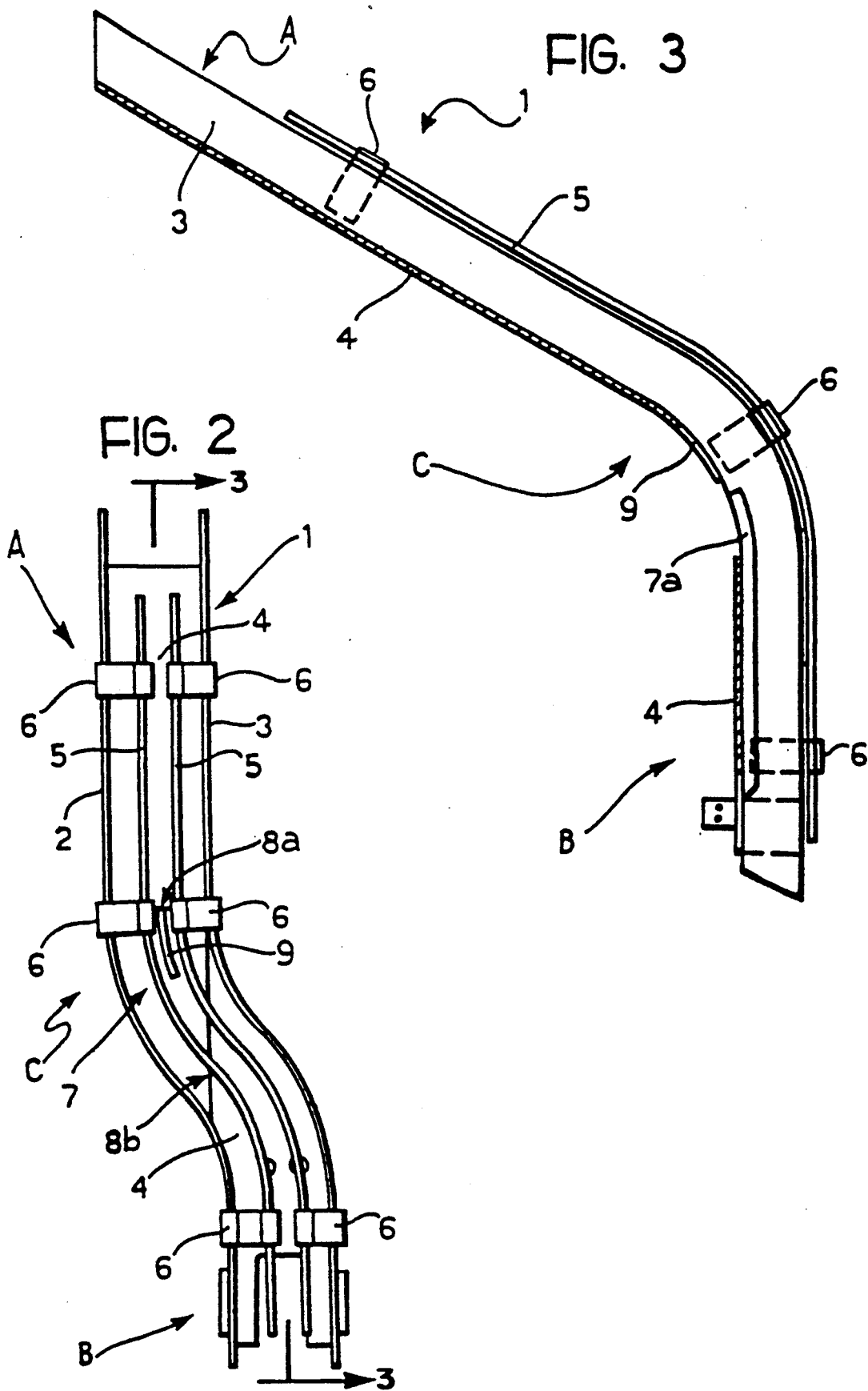

DEVICE FOR TRANSPORTING A FLOW OF PRODUCTS TO BE PACKAGED, WITH THE DISCHARGE OF WRONGLY-POSITIONED PRODUCTS

The present invention relates to conveyor devices and has been developed with a view to its possible use in the automatic packaging industry, for example for food products such as biscuits, crackers or the like.

More specifically, the invention relates to a device for transporting a flow of stacked products which advance with their major dimension substantially perpendicular to their direction of advance, comprising:
first and second opposing wall means which guide the products in the direction of advance, and
third wall means extending between the first and second wall means for maintaining the products in guiding relationship with the first and second wall means; the third wall means having a break for enabling products which are arranged with their major dimension parallel to the direction of advance to be expelled from the device.

For example, in a known solution, the device is constituted by a substantially horizontal channel-shaped guide along which the products advance in an upright condition and leaning on each other.

A portion of the guide has the base wall almost completely removed, only a narrow strip being left in correspondence with one of the side walls.

The hole thus formed is intended to allow wrongly-positioned products, that is products which are accidentally travelling flat along the base wall, to be expelled from the flow.

The elimination of the wrongly-positioned products is important to ensure that the equipment situated downstream operates correctly.

As well as the problem that packages are produced with products wrongly positioned, the products may in fact be chewed or chopped up by the packaging equipment, thus soiling it and possibly obstructing its operation. Moreover, there is a risk that wrongly-positioned products may cause jamming or blockage of the flow of products which are being handled.

The technical solution referred to above does not solve the problem of the expulsion of wrongly-positioned products completely. It can, in fact, happen that when a product lying flat on the base wall of the device reaches the position in which the expulsion opening is provided, it is not in fact expelled.

In most cases, in fact, a block of products which are correctly oriented but slightly raised above the rest of the flow rests on the product: when the product which is lying flat reaches the opening in the base wall, it remains caught along one of its edges between the overlying block of products and the narrow remaining portion of the base wall, which must, of course, be present to prevent the correctly-positioned products in the flow from falling through the discharge opening as well.

Often the product which is lying flat is also gripped on opposite sides between the products immediately preceding and immediately following the overlying block of products. The wrongly-positioned product is thus also retained in this case and continues to be transported in the flow.

The object of the present invention is to produce a device of the type specified above, in which the problems described are eliminated so that the wrongly-positioned products are expelled reliably.

According to the present invention, this object is achieved by virtue of a device of the type specified above, characterized in that:
the first and second means have corresponding curves in correspondence with the break in the third wall means so that the products are made to travel along a curved path with relative pivoting of adjacent products in the flow, and
at least in correspondence with the break, the wall means extend along a path which descends generally (preferably almost vertically) in the direction of advance of the products.

The invention will now be described, purely by way of non-limiting example, with reference to the appended drawings, in which:

FIG. 1 shows the general location of a device according to the invention within a packaging line, FIG. 2 is a front elevation of the device according to the invention, and FIG. 3 is a side elevation of the device of FIG. 2.

In the drawings, a device, generally indicated 1, is intended for transporting a flow of stacked products P (for example biscuits or crackers) to be packaged, which products advance in a given direction with their major dimension substantially perpendicular to that direction.

By way of example, the device 1 shown in the drawings may be arranged immediately upstream of a machine, such as that described in Italian Pat. No. 1,186,419, in the name of the same Applicant, and in the corresponding U.S. Pat. No. 4,755,093, for forming stacks of products.

In the example illustrated, the products P arrive in a continuous or substantially-continuous flow from above with their major dimension arranged perpendicular to their direction of advance. In other words, in the arrangement shown in FIG. 1, the products P, which are generally flat in shape, descend in an approximately vertical stack.

The device 1 is constituted essentially by a channel-shaped guide which can be seen to comprise two opposing side walls 2, 3 interconnected by a base wall 4.

The two opposing side walls 2 and 3 guide the advancing products whilst the base wall 4 cooperates therewith to support the products for guidance in the direction of advance.

In order to improve the containing action, it can be useful to supplement the action of the base wall 4 by further guide elements located on the opposite side with respect to the side walls 2 and 3. In the embodiment shown, these further guide elements are constituted by rods 5 mounted on respective supports 6 fitted to the side walls 2 and 3 on the opposite side to the base wall 4.

Naturally the elements 2 to 5 may be formed in a manner other than that illustrated whilst retaining their function as containment-wall means.

For example, the walls 2, 3 and 4 which are shown in the form of continuous walls, may be formed with a cage structure with the use of rods similar to the rods 5.

The overall view of the device 1 shows two end portions, an upper one A and a lower one B respectively in use, which extend along straight paths and an intermediate portion C in which the two walls 2 and 3 form a generally S-shaped curve.

As can better be seen in the front view of FIG. 2, the presence of the intermediate S-shaped portion means that, within the generally-vertical arrangement of the device 1, the two straight portions A and B are offset from each other.

In the intermediate S-shaped portion, there is a break in the base wall 4 where a portion, generally indicated 7, has been removed.

The base wall 4 is interrupted and has an output or upstream edge 8a immediately before the portion C resumes its normal development within the S-shaped portion, with a lead-in or downstream edge 8b (in the direction of advance of the products P) which extends in a position such as not to interfere with the path of advance defined by the upper straight portion of the device 1.

In the embodiment illustrated in the drawings (with specific reference to the orientation of FIG. 2), the S-shaped curve of the walls 2 and 3 in correspondence with the portion C means that the lower, straight portion B of the device is offset towards the right relative to the upper straight portion A. The edge 8b thus extends along a line which is substantially aligned with the (right hand) wall 3 of the upper portion A, and meets the (left hand) wall 2 of the lower portion B of the device in the lower part of the curved portion C.

In other words, the edge 8b downstream of the break extends so as not to interfere with the straight path followed by the products travelling along the upper portion A of the device and this facilitates the expulsion of wrongly-located products according to the criteria described below.

The lateral section of FIG. 3 shows how the curved portion C of the device 1 extends generally downwards in the general direction of advance of the products P, along an arcuate path which connects the lower portion B of the device 1, which is usually vertical or almost vertical, to the upper portion A which is generally inclined (for example at 30°-60°, preferably 45°) to the vertical.

In fact the upper portion A is intended to collect the products P supplied from above. In most applications, the products in question advance on a horizontal supply conveyor (not illustrated) stacked (side-by-side) with their larger dimension oriented vertically.

Finally, a guide tang indicated 9 extends from the base wall 4 (the output edge 8a) into the region 7 to improve the guiding of the products P according to criteria which will better be described below.

For this purpose—and particularly for reducing sliding friction—it is envisaged that one or both of the side walls 2, 3 have an "undercut" in correspondence with the curved portion S, in the side facing the base wall 4.

The operation of the device according to the invention is based on the different behaviours, in traversing the curved portion C, of correctly-positioned products P and wrongly-positioned products, that is products which slide downwards within the upper portion A flat against the base wall 4.

Once the correctly-arranged products reach the curved portion C, they tend to follow the S-shaped path defined by the side walls 2 and 3. The fact that the base wall 4 is absent in this portion has no appreciable affect on the movement of the products since the descending arrangement of the portion C means that each product P is pinched slightly between adjacent products (that is the underlying product and the overlying product) so that, as long as there is no positive thrust in the direction of expulsion through the open region 7, each product retains its correct position within the stack spontaneously.

As they travel along the curve C, the correctly-arranged products P pivot away from each other slightly, first in one direction, then in the other (in accordance with the directions of the two successive bends of the curve), the movement being definable to a certain extent as "vertebral", or "spinal", since it closely resembles the relative movement of the vertebrae during the bending of the vertebral column.

In any case, the containment of the correctly-positioned products P may be improved by the use of the tang 9, the length of which may differ in dependence on the applicational requirements (the dimensions and weight of the products, the inclination of the curve C, etc...).

Once they have reached the upstream edge 8a of the region 7, the wrongly-arranged products tend to continue along the straight path defined by the upper portion A of the device 1 and are thus discharged from the device.

As soon as they have passed the edge 8a, the products which are sliding flat against the base wall 4 in fact tend to tilt downwardly due to gravity. Since there is no longer any containment as a result of the complete break in the base wall 4, the wrongly-positioned products are expelled and fall out of the device 1. Moreover, the "vertebral" movement of the correctly-positioned products eliminates any possibility of the retention of those wrongly-positioned products which may be pinched between the products immediately upstream and immediately downstream of the block of products superposed thereon. The "vertebral movement" in any case effectively reduces the pinching.

Similarly, no retaining action can result from products being caught between the correctly-arranged products and the base wall which, unlike in prior art devices, is removed completely in at least part (that adjacent the edge 8a) of the curved region C.

Naturally, the principle of the invention remaining the same, the forms of embodiment and details of construction may be varied widely with respect to those described and illustrated, without thereby departing from the scope of the present invention.

I claim:

1. A device for transporting a flow of stacked products which advance with their greater dimension substantially perpendicular to the direction of advance, comprising:
   first and second opposing wall means which guide the products in the direction of advance, and
   third wall means extending between the first and second wall means for maintaining the products in guiding relationship with the first and second wall means; the third wall means defining a break for enabling products which are arranged with their greater dimension parallel to the direction of advance to be expelled from the device,
   wherein:
   said first and second wall means define a lateral curved section positioned in correspondence with said break in said third wall means so that the products are made to travel along a curved path with relative pivoting of adjacent products in the flow,
   said break is defined by end edges which are upstream and downstream respectively in the direction of advance of said products and said third wall means define a complete break at least adjacent said upstream edge which extends entirely across the third wall means to each of the first and second wall means, and at least in correspondence with said break, said first, second and third wall means extend along a path which descends generally in the direction of advance of said products.

2. A device according to claim 1, wherein said device includes two portions which extend along respective straight paths and an intermediate portion between said two portions and wherein said first and second wall means have said curves in correspondence with said intermediate portion so that said straight paths are offset relative to each other.

3. A device according to claim 2, wherein said two portions constitute an upper portion and a lower portion respectively relative to said intermediate portion and wherein said lower portion is arranged with its straight path substantially vertical whilst said upper portion is arranged with its straight path inclined at a given angle to the vertical.

4. A device according to claim 3, wherein the size of said given angle is of the order of 30°-60°.

5. A device according to claim 3, wherein the size of said given angle is of the order of 45°.

6. A device according to claim 1 wherein said first and second wall means are curved in a generally S shape in correspondence with said break.

7. A device according to claim 1, wherein said break is defined by end edges which are upstream and downstream respectively in the direction of advance of said products and wherein said third wall means define a complete break at least adjacent said upstream edge.

8. A device according to claim 2, wherein said break is defined by end edges which are upstream and downstream respectively in the direction of advance of said products and wherein said downstream edge extends so as not to interfere with said straight path of that one of the said two portions which extends upstream of said intermediate portion.

9. A device according to claim 1, wherein said wall means are in the form of substantially-continuous walls.

10. A device according to claim 1, wherein further wall means extend between said first and second wall means on the opposite side from said third wall means.

11. A device for transporting a flow of stacked products which advance with their greater dimension substantially perpendicular to the direction of advance, comprising:

first and second opposing wall means which guide the products in the direction of advance, and third wall means extending between the first and second wall means for maintaining the products in guiding relationship with the first and second wall means; the third wall means defining a break for enabling products which are arranged with their greater dimension parallel to the direction of advance to be expelled from the device, wherein:

said first and second wall means define a lateral curved section positioned in correspondence with said break in said third wall means so that the products are made to travel along a curved path with relative pivoting of adjacent products in the flow so that one lateral end of a pivoted product is in contact with adjacent products and an opposite lateral end of the pivoted product is divergently spaced from adjacent products, said break is defined by end edges which are upstream and downstream respectively in the direction of advance of said products, the downstream edge of the break extending transverse to the curved path of the curved section and substantially parallel to the first and second wall means of a section of the device which is upstream from the curved section, and at least in correspondence with said break, said first, second and third wall means extend along a path which descends generally in the direction of advance of said products.

* * * * *